2,923,344

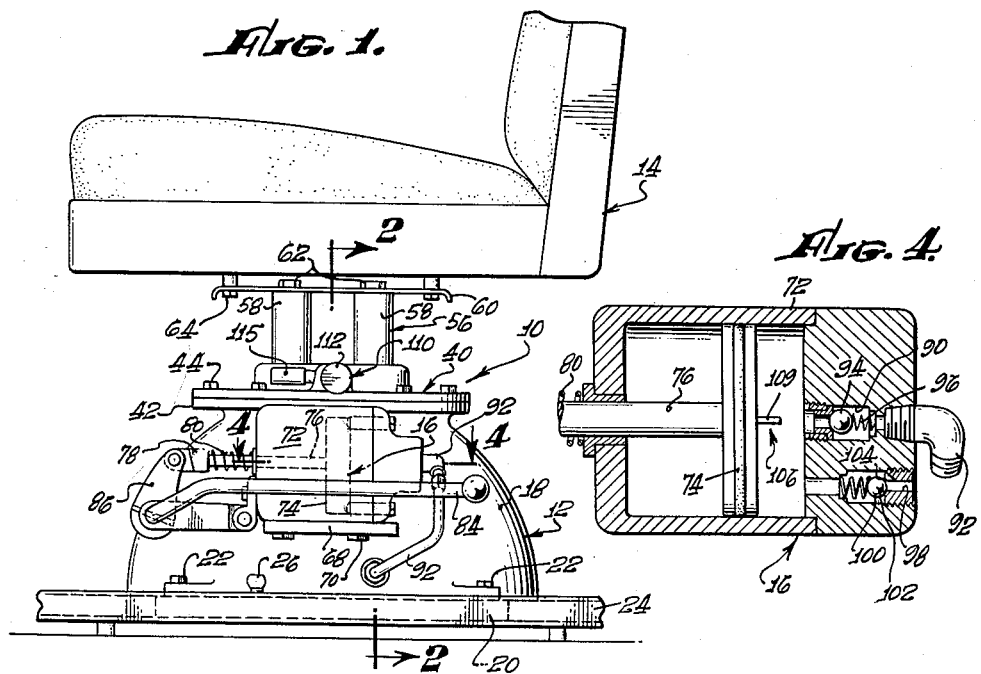

VEHICLE SEATING APPARATUS

J. Gerard La Voie, Noel R. La Voie, and Clarence B. Wunderlich, Los Angeles County, Calif.

Application May 21, 1957, Serial No. 660,581

1 Claim. (Cl. 155—9)

This invention relates to an adjustable, shock-absorbing seating apparatus for use in trucks and similar vehicles to permit the seat incorporated in the seating apparatus to be adjusted at a predeterrmined height and to prevent road and other shocks from being imposed upon the person seated in the seat.

The problems encountered in the provision of adequate seating for trucks, heavy road working equipment, farm equipment, and the like are well known to those skilled in the art. For many years past, an attempt has been made to absorb the vibratory and shock loads encountered in the use of the above mentioned and similar vehicles by providing springs for absorbing said shock and other loads, but such sprung devices have serious inadequacies in that there is no means for controlling the spring action in accordance with the weight of the person seated upon a conventionally sprung seat, nor is there any way to control the extent of movement of the seat in such conventionally sprung devices.

Moreover, hydraulic devices have been provided wherein vertical adjustment of the seat has been accomplished by the pumping of hydraulic fluid into a piston supporting cylinder so that by pumping a greater or lesser amount of fluid into the cylinder the seat will be proportionally raised or lowered. However, the ability of such hydraulically adjusted devices to absorb shock loads is limited by virtue of the relative incompressibility of the fluid utilized and, once again, reliance must be had for shock absorption characteristics on mechanical springing of the seats incorporated in such hydraulically adjustable seating apparatus.

It is, therefore, an object of our invention to provide a seating apparatus which is both pneumatically adjustable and which absorbs shock and vibratory loads encountered during the translation of the vehicle in which the seating apparatus is installed by a pneumatic cushioning means incorporated in the seating apparatus.

Another object of our invention is the provision of a seating apparatus of the aforementioned type which incorporates means for adjusting the height of the seat incorporated in the apparatus to accommodate individuals of different sizes and which also accommodates individuals of different weights so that the shock absorbing characteristics of the apparatus can be adapted to cope with individuals of widely varying weights.

A further object of our invention is the provision of an apparatus of the aforementioned character wherein the extent of movement of the seat incorporated in the seating apparatus, as occasioned by vibratory, shock and other loads, can be controlled within predetermined limits so that when such loads are encountered the seat incorporated in the apparatus will deflect to an extent desired by the individual occupying the same.

Another object of our invention is the provision of a seating apparatus of the aforementioned character wherein the "softness" or "hardness" of the suspension of the seat incorporated in the apparatus and its response to vibratory, shock and other loads may be readily controlled so that individuals who do not prefer a relatively "soft" seat wherein the majority of the loads are absorbed by immediate movement of the seat can obtain the desired characteristic and wherein individuals who prefer a very "soft" seat can also be accommodated by adjustment of the apparatus.

A further object of our invention is the provision of an apparatus of the aforementioned character which includes a pedestal incorporating a pneumatic cylinder and the reservoir for supplying the same so that the reservoir serves as a pneumatic cushion tending to absorb, in conjunction with the pressurized air in the cylinder, shock, vibratory and other loads imposed upon the seat incorporated in the apparatus.

A further object of our invention is the provision of an apparatus of the aforementioned character wherein pump means is provided on the aforesaid pedestal and may be energized to raise the seat incorporated in the apparatus to a desired height with reference to the pedestal.

Another object of our invention is the provision of an apparatus of the aforementioned character wherein the aforesaid pedestal is mounted upon track means to permit the longitudinal translation of the pedestal and the entire apparatus to facilitate the adjustment of the seating apparatus with reference to the controls of the vehicle in which the apparatus is incorporated.

A further object of our invention is the provision of a seating apparatus of the aforementioned character which is characterized by its simplicity of construction and ease of operation and which, furthermore, is easily adjustable by the individual utilizing the same when seated on the seat constituting a portion of the apparatus.

Another object of our invention is the provision of an apparatus of the aforementioned character wherein the seat incorporated in the apparatus is mounted on a plurality of symmetrically arranged rods which are secured at their upper extremities to the underside of the seat and at their lower extremities to a piston located within the aforementioned cylinder.

A structure similar to that disclosed in the present application, but utilizing a single supporting rod, is disclosed in our copending application, Serial No. 505,285, Filed May 2, 1955, entitled "Adjustable Seating Apparatus for Vehicles," now Patent No. 2,879,829, granted Mar. 31, 1959.

Other objects and advantages of the invention will be apparent from the following specification and accompanying drawing which is for the purpose of illustration only and in which:

Fig. 1 is a side elevational view of a seating apparatus constructed in accordance with our invention;

Fig. 2 is a vertical, sectional view taken on the line 2—2 of Fig. 1;

Fig. 3 is a partial plan view of the pedestal of the apparatus and the pump mounted thereupon; and Fig. 4 is a vertical, sectional view taken on line 4—4 of Fig. 1.

Referring to the drawing and particularly to Figs. 1 and 2 thereof, we show a seating apparatus 10 constructed in accordance with the teachings of our invention and including, generally, a pedestal 12 and a seat 14 supported thereupon for movement with respect thereto. Secured to the side of the pedestal is pump means 16 adapted to raise or lower the seat 14, in a manner to be described hereinbelow.

The pedestal 12, as best shown in Figs. 1, 2, and 4 of the drawing, is constituted by a substantially hemispherical housing 18 to the base of which are secured laterally extending flanges 20, as by means of bolts 22 or other conventional fastening expedients. The outer edges of the flanges 20 are, as best shown in Fig. 1 of the drawing, received in elongated channel-shaped track members 24, said track members having thumbscrews 26 associated therewith and impinging upon the upper surfaces of the flanges 20. When the thumbscrews 26 are loosened, the flanges 20 can be moved longitudinally in the desired direction in the track members 24. Conversely, when the thumbscrews are tightened, they impinge upon the upper surfaces of the flanges 20 and thus maintain the pedestal 12 and the entire seating apparatus 10 in a predetermined adjusted position.

The hemispherical housing 18 defines, as best shown in Fig. 2 of the drawing, a substantially hemispherical chamber 28 which serves as a reservoir 30, in a manner to be described in greater detail below. Formed in the bottom wall of the reservoir 30 is an annular seat 32 in which is located the lowermost end of a cylinder 34, the uppermost extremity of which is mounted in an opening 36 in the top of the housing 18, a seal 38 being provided in the wall of the opening to seal the cylinder 34 against fluid leakage therepast.

The top of the housing 18 is enclosed by a cap member 40, said cap member being substantially annular in configuration and being securable to an annular flange 42 on the upper end of the housing 18 by means of bolts 44. Formed integrally with and located centrally of the cap member 40 is a depending boss 45 which fits within the upper end of the cylinder 34 and is provided with a plurality of symmetrically located bores 46 which are counterbored at 25 to receive ball bushings 27 therein.

Mounted in the cylinder 34 below the cap member 40 is a piston 52 on the periphery of which is mounted an O-ring 54. Secured to the top of the piston 52 by means of bolts 29 are supporting means 56 for the seat 14 constituted by a plurality of piston rods 58. The upper extremities of the rods 58 extend through the ball bushings 27 and are vertically movable therein. An seat supporting plate 60 is fastened to the tops of the rods 58 by means of bolts 62, said plate being, in turn, secured to the underside of the seat 14 by means of bolts 64.

Therefore, as an individual seated in the seat 14 shifts his weight or other forces are imposed on the seat which might cause the rods 58 to bind in the bores 25 and 46, such binding is prevented by the action of the ball bushings 27. Consequently, the seat 14 and the rods 58 can move up and down freely at all times. Moreover, the three rods 58 serve as guides to prevent rotation of the seat 14 with respect to the pedestal 12 and thus insure proper orientation of the seat 14 on the pedestal 12 at all times.

Fastened to the side of the housing 18 of the pedestal 12 by means of an integral pad 68 formed thereupon and by means of bolts 70 passing through said pad is the substantially cylindrical housing 72 of the pump means 16. The pump means 16 includes a piston 74 located in the cylindrical housing 72 and operable by a piston rod 76 extending from said housing. A fitting 78 is secured to the outer extremity of the rod 76 and a compression spring 80 is seated between the housing 72 and the fitting 78 to bias the piston rod 76 and thus the piston 74 in a left-hand direction, as best shown in Fig. 1 of the drawing.

An operating handle 84 is secured to a lever 86 for reciprocating the piston rod 76 and thus causing reciprocation of the piston 74 in the housing 72. Formed in one end of the housing 72 is an outlet port 90 which is connected by tubing 92 to the reservoir 30. Mounted in the outlet port 90 is a ball-type check valve 94 which is biased into closed position by a spring 96 to prevent compressed air in the reservoir 30 from leaving the reservoir after a pumping stroke of the piston 74 has been completed. An air intake port 98 also communicates with the interior of the housing 72 and has a spring-biased, ball-type check valve 100 mounted therein for permitting influx of ambient air into the interior of the housing 72 during the suction stroke of the piston 74 and for preventing efflux of a substantial portion of said air during the compression stroke of the piston 74.

The ball-type check valve 100, when closed, engages a seat 102 which is notched at 104 to permit compressed air to be by-passed from the interior of the housing 72 in a manner to be described in greater detail below.

Operatively supported upon the right-hand face of the piston 74, as best shown in Fig. 4 of the drawings, is a releasing means 106 for the check valve 94, said releasing means being constituted by an elongated finger or releasing member 109 which will engage the check valve 94 to urge said check valve off its seat and to permit air under pressure to be released from the reservoir 30 into the interior of the housing 72. The released air under pressure is by-passed from the interior of the housing 72 through the notch 104 in the seat 102 despite the fact that the check valve 100 is seated upon said seat.

A passage 108 is provided in the cap member 40 and communicates at its lowermost end with the upper portion of the cylinder 34 above the piston 52 and at its outermost end through a port 109 with the ambient air. Located in the passage 108 is an adjustable valve 110 constituted by the bolt 112 whose inner extremity is adapted to restrict flow of air through the port 109 and which is maintained in a desired position by means of a spring 114. A powdered metal filter 115 filters air drawn through the port 109.

The extent to which the inner extremity of the bolt 112 restricts air flow from and into the passage 108 by reducing the inner end of the port 109 determines the amount of air that will flow out of the port 109 during an upward stroke of the piston 52. During the downward stroke of the piston 52 the vacuum created in the cylinder 34 by the downward movement of said piston draws ambient air into the passage 108 through the port 109 and into the upper end of the cylinder 34.

In order to permit flow of compressed air from the reservoir 30 into the lower portion of the cylinder 34, the lower extremity of the cylinder is provided with a plurality of radial ports 122, one of which is shown in Fig. 2 of the drawing. In installing the cylinder 34, the radial ports 122 are juxtaposed to radial slots 124 provided in the annular seat 32 to establish communication through the slots 124 with the ports 122 and to establish fluid passages for the free flow of air from the reservoir 30 to the lower portion of the cylinder 34 below the piston 52 and to also permit free flow of air from the lower portion of the cylinder 34 into the reservoir 30.

While we have described the connection of the upper portion of the cylinder 34 with the ambient air as being through a passage 108 incorporating an adjustable control valve 110, it is possible to utilize a fixed restriction in the passage 108 and to eliminate the adjustable control valve 110 from the passage 108. With a construction of this character, while control is imposed upon the upward and downward movement of the piston 52 in the cylinder 34, the individual occuping the seat is unable to control the extent of upward movement in a manner similar to that which is possible with the utilization of the adjustable control valve 110.

As previously indicated, the seating apparatus 10 is adapted to accommodate individuals of different heights and weights, to absorb vibratory shock and other loads, and to permit an individual seated in the apparatus to adjust his position longitudinally with reference to the steering wheel and control panel of the vehicle in which the seating apparatus 10 is installed.

For instance, when an individual first seats himself in the seat 14 of the seating apparatus 10, he can, of course, determine immediately whether the seat 14 is vertically spaced too low or too high for comfort and he can also further determine whether the pneumatic springing of the seat on the piston 52 is too hard or too soft by bouncing on the seat 14. If the seat 14 is not properly adjusted, the air pressure in the lower part of the cylinder 34 and the reservoir 30 can be released by merely pressing downwardly on the handle 84 to urge the releasing means 106 into engagement with the check valve 94 by inward movement of the piston 74 carrying the same.

When such releasing action of the check valve 94 by the releasing means 106 takes place, the air from the cylinder 34 flows through the ports 122 and associated slots 124 through the tubing 92 and past the check valve 94 in through the end of the housing 72. The air pressure is then bled off through the by-pass notch 104 despite the fact that the check valve 100 is spring-biased onto the seat 102. If desired, the handle 84 may be maintained in depressed position until the piston 52 bottoms on the bottom of the cylinder 34, or until the seat 14 reaches a suitable height. Assuming, however, that the individual has permitted the seat 14 to travel downwardly to the full extent, the check valve 94 can be closed by removing the releasing means 106 from operative engagement therewith.

The repeated depression of the pump handle 84 will then cause air to be pumped past the check valve 94 into the reservoir 30 through the tubing 92. The air under pressure flows from the reservoir 30 through the radial slots 124 and associated ports 122 into the cylinder 34 to initiate upward movement of the piston 52. During the pumping action of the piston 74, ambient air is, of course, drawn into the interior of the housing 72 on the left-hand stroke of the piston 74, as shown in Fig. 5, by withdrawing the check valve 100 off the seat 102 against the bias of the spring with which it is associated.

When the seat 14 has reached a height suitable to the person occupying the same, the pumping action of the pump means 16 can be terminated. By bouncing up and down on the seat 14, the individual occupying the same can then determine whether the rate of the turn of the seat 14 under vibratory and shock loads is satisfactory. The downward stroke of the piston 52 is, of course, determined by the pressure of the air in the cylinder 34 and its associated reservoir 30, while the upward stroke of the piston 52 is, of course, determined by the extent to which the check valve 114 is maintained off its associated seat 112 by the action of the control member 118. During upward movement of the piston 52, the piston 52 will force air in the upper portion of the cylinder 34 through the passage 108 past the partially open port 109. On the other hand, during the downward stroke of the piston 52, the negative pressure area created in the upper portion of the cylinder 34 by said downward movement permits ambient air to enter the upper portion of the cylinder 34 through the passage 108 and port 109.

On the other hand, if the screw 112 is so adjusted that it closes the port 109, upward movement of the piston 52 will be extremely limited since the air compressed in the upper portion of the cylinder 34 will not be permitted to pass through the passage 108 and the lateral port 109 to ambient air. Therefore, if the screw 112 is maintained in relatively wide open position with respect to the port 109, it is obvious that relatively free upward movement of the piston 52 and the piston rods 58 associated therewith will occur, thus permitting relatively free upward movement of the seat 14 secured to the upper extremity of said piston rod. In those embodiments of our invention wherein the valve screw 112 is dispensed with and a standard sized restriction is inserted in the passage 108, it is obvious that both the upward and downward movement of the piston 52 will be at a constant rate, the downward movement being limited solely by the restriction of the passage 108 and the cushion of air provided in the lower portion of the cylinder 34 and the reservoir 30.

It should be pointed out at this juncture that the relatively large mass of air contained in the reservoir 30 and the fact that the reservoir 30 communicates directly with the lower portion of the cylinder 34 results in a very desirable pneumatic cushion for the action of the piston 52 and thus provides a very comfortable shock-absorbing effect for the individual seated in the seat 14. On the other hand, a relatively large volume of high pressure air can be contained in the reservoir 30 and the lower portion of the cylinder 34 to provide a very hard seat 14 for those individuals who are inclined to select this type of adjustment.

It should be readily apparent, therefore, that by the adjustment of the height of the seat through the use of the pump means 16 and the adjustment of the hardness or softness of the shock-absorbing action by the use of the pump means 16 in conjunction with the control valve 110, a seating apparatus is provided which can be accommodated to suit the idiosyncrasies of the individual occupying the same.

To obtain longitudinal adjustment of the seating apparatus 10 with reference to the steering wheel or the control panel of the vehicle in which the apparatus 10 is located, it is merely necessary to loosen the thumbscrews 26 to free the flanges 20 in the tracks 24 so that the pedestal 12 on the flanges 20 may be moved longitudinally relative to the control panel or steering wheel, not shown. After the proper longitudinal adjustment has been achieved, the thumbscrews 26 can be tightened and further movement of the pedestal 12 prevented.

We thus provide by our invention a seating apparatus which is characterized by simplicity and compactness of construction and by adjustability in a variety of aspects of its operation to conform to the desires of the particular individual occupying the seat incorporated in the seating apparatus. Another advantage of the construction provided by our invention is the elimination of the lack of control characteristic of conventional mechanically sprung seats and the elimination of the relative hardness of the shock-absorbing action of hydraulically sprung seating apparatus.

We claim as our invention:

In a shock-absorbing, seating apparatus, the combination of: a housing; a seat; a plurality of separate supporting columns for said seat, said supporting columns being arranged about a common center and secured to the underside of said seat; a piston secured to the lower extremity of said supporting columns; a cylinder for the reception of said piston, said cylinder having uninterrupted ports in the wall thereof and receiving all of said supporting columns; a reservoir in said housing communicating at all times through said ports with said cylinder; and a pump mounted on said housing for pumping fluid into said reservoir to raise said piston in said cylinder.

References Cited in the file of this patent

UNITED STATES PATENTS

| | | |
|---|---|---|
| 579,094 | Merker | Mar. 16, 1897 |
| 1,002,823 | Cowles | Sept. 12, 1911 |
| 1,257,950 | Albright | Feb. 26, 1918 |
| 1,423,904 | Blyburg | July 25, 1922 |
| 1,999,848 | Ries | Apr. 30, 1935 |
| 2,092,669 | Greve | Sept. 7, 1937 |
| 2,392,477 | Holm | Jan. 8, 1946 |
| 2,760,552 | Decker | Aug. 28, 1956 |
| 2,788,842 | Ohlenkamp | Apr. 16, 1957 |

FOREIGN PATENTS

| | | |
|---|---|---|
| 157,738 | Germany | Jan. 14, 1905 |
| 1,073,843 | France | Mar. 24, 1954 |